United States Patent Office 3,326,244
Patented June 20, 1967

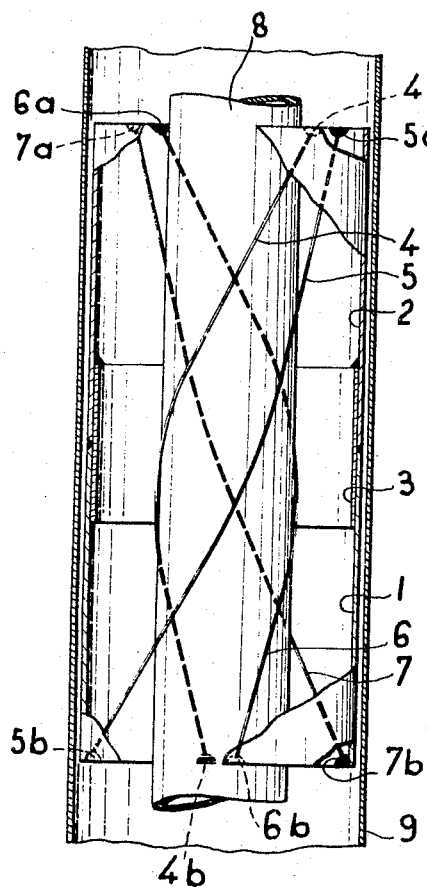
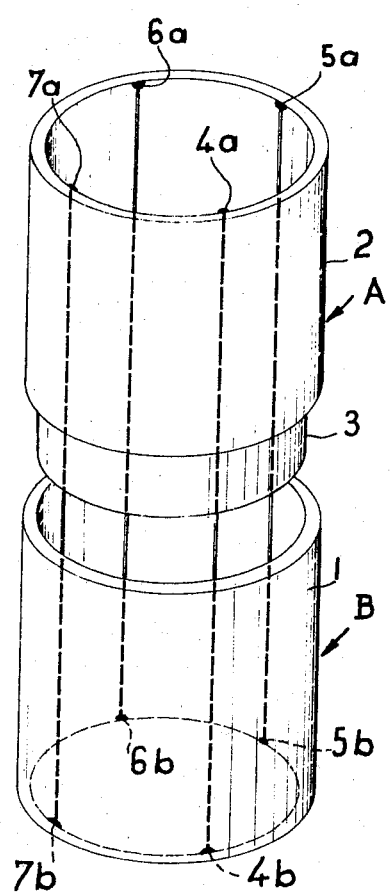
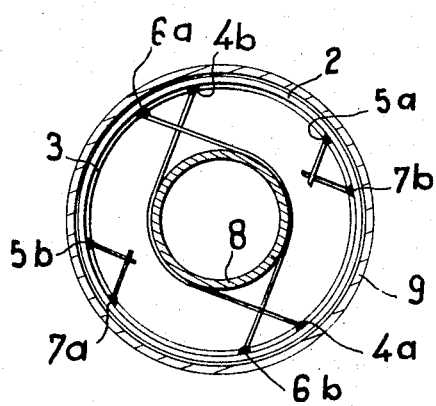

3,326,244
DEVICE FOR CENTERING AN INNER CONDUIT WITHIN AN OUTER CONDUIT
Pierre Charles, Sceaux, Camille Prevost, Lechesnay, and Olivier Testard, Clamart, France, assignors to Commissariat a l'Energie Atomique, Paris, France
Filed Sept. 3, 1964, Ser. No. 394,300
Claims priority, application France, Sept. 5, 1963, 946,679
2 Claims. (Cl. 138—114)

The present invention relates to improvements in devices which are designated for the purpose of centering an inner conduit within an outer conduit, such improvements being applicable more especially although not exclusively to pipeline elements for liquefied gases.

Pipeline elements of this type usually consist of two conduits having different diameters and disposed in coaxial relation, a vacuum being created between said conduits in order that the gas to be transported may be thermally insulated from the surrounding atmosphere as completely as possible. However, heat exchanges by conduction between the outer conduit (which constitutes the hot zone) and the inner conduit (which constitutes the cold zone) cannot be entirely eliminated since it is necessary to center the said inner conduit and consequently to establish mechanical connections between the two conduits. Under these conditions, it proves necessary to reduce such mechanical connections to a minimum which is compatible with the strength and rigidity of the assembly.

To this end, the present invention is concerned with a device for centering within an outer conduit an inner conduit which is intended especially for the transportation of liquefied gas at low temperature, characterized in that said device comprises two coaxial tubular elements having the same diameter which are slidably mounted inside the outer conduit and immovably secured end to end relatively to each other, and a plurality of flexible wires having the same length, the two ends of which are attached respectively to the two tubular elements and are displaced relatively to each other through an angle which is constant from one wire to the other, said wires being adapted to form an arc in contact with the inner conduit.

Reference being made to the diagrammatic FIGURES 1 to 3 of the accompanying drawings, the description which follows below relates to one nonlimitative example of practical application of the improved centering device according to the invention. The constructional arrangements which will be described in connection with said example must be considered as forming part of the invention, it being understood that any equivalent arrangements could equally well be employed without thereby departing from the scope of this invention.

In these drawings:
FIG. 1 is a view in perspective of the device prior to the centering operation;
FIG. 2 is a longitudinal sectional view;
FIG. 3 is a transverse sectional view (in which only two wires have been shown) of the same device after the said operation has been performed.

The device in accordance with the invention consists of two coaxial tubular elements 1 and 2 which have the same diameter and which are placed as shown in FIGURE 1 in the line of extension of each other. These elements can be partially fitted one inside the other and are capable of rotating relatively to each other about their common axis by virtue of the spigot joint 3 which forms part of the element 2. The external diameter of said spigot joint is substantially equal to the internal diameter of the element 1.

The external diameter of the elements 1 and 2 is calculated so as to permit these latter to slide freely without play along the internal wall of the outer conduit in which said elements ade designed to be inserted.

Four wires 4, 5, 6, 7 of stainless steel, the length of which is identical and slightly greater than the total length of the elements 1 and 2 in their engaged position, are disposed longitudinally in the interior of the assembly as constituted by said elements and are secured, for example by brazing, to the non-adjacent ends A and B of these latter, namely:

At 4a on A and at 4b on B in the case of the wire 4
At 5a on A and at 5b on B in the case of the wire 5
At 6a on A and at 6b on B in the case of the wire 6
At 7a on A and at 7b on B in the case of the wire 7.

The points 4a, 5a, 6a, 7a on the one hand and 4b, 5b, 6b, 7b on the other hand are located on the end transverse sections of the elements 1 and 2 at an angular distance of 90° with respect to each other.

In addition, the wires 4, 5, 6 and 7 must not intersect.

After inserting the inner conduit 8 (as shown in FIGS. 2 and 3) within the assembly which has just been described, the elements 1 and 2 are subjected to a relative movement of rotation which is equal to approximately one quarter of a revolution. This movement is naturally imparted to the respective ends of the four wires 4, 5, 6 and 7, thereby causing these latter to wind around the inner conduit 8 until a clamping position is reached as shown in FIGS. 2 and 3. In this position, said inner conduit is thus centered relatively to the assembly which is formed by the elements 1 and 2, and is also centered at the same time with respect to the outer conduit 9 (as shown in FIGS. 2 and 3) as a result of the equality in length of the four wires.

The said wires can be set at the desired tension by means of two tightening-keys fixed respectively on the elements 1 and 2; the rigidity which is obtained in the position reached on completion of a centering operation as hereinbefore described is ensured by means of a variable number of spot welds performed either by brazing or arc welding inside the spigot joint 3 of the elements 1 and 2.

It will be readily apparent that the materials of which the elements 1 and 2 are formed as well as the materials of which the wires 4, 5, 6 and 7 are formed must have a heat conductivity which is as low as possible.

The number of four wires which has been mentioned in reference to the form of embodiment hereinabove described is not given in any limiting sense, as it will be understood that this number can vary according to the weight of the inner conduit which also governs the diameter of the wires which are employed; moreover, the excess length of said wires with respect to the total length of the elements 1 and 2 when assembled together will vary as a function of the diameter of the inner conduit.

It will be apparent from the foregoing description that the device in accordance with the invention which has just been described is of particularly simple design and consequently has a very wide field of application.

As will be readily understood, the invention is not limited to the form of embodiment which has been described and illustrated and which has been chosen solely by way of example; the invention can be considered as also including within its scope those pipeline elements for the transportation of liquefied gas which are fitted with centering devices according to the invention.

What we claim is:
1. Device for centering an inner conduit within an outer conduit, wherein said device comprises two coaxial tubular elements having the same diameter which are slidably mounted inside the outer conduit, means for securing said elements against rotation relatively to each other and for preventing any axial movement of said elements towards each other and a plurality of flexible wires having the same length, the two ends of which are attached respectively to the two tubular elements and are displaced relatively to each other through an angle which is constant from one wire to the other, said wires being adapted to form an arc in contact with said inner conduit.

2. Device in accordance with claim 1, wherein one of the elements is provided with a tubular extension which is adapted to slide within the other element.

No references cited.

LAVERNE D. GEIGER, *Primary Examiner.*

B. KILE, *Assistant Examiner.*